United States Patent
Takeuchi (10) Patent No.: US 12,204,853 B2
(45) Date of Patent: Jan. 21, 2025

(54) DATA EXTRACTION APPARATUS, DATA EXTRACTION METHOD, AND STORAGE MEDIUM

(71) Applicant: Mitsubishi Electric Corporation, Tokyo (JP)

(72) Inventor: Takeshi Takeuchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 354 days.

(21) Appl. No.: 17/801,064

(22) PCT Filed: Mar. 30, 2020

(86) PCT No.: PCT/JP2020/014600
§ 371 (c)(1),
(2) Date: Aug. 19, 2022

(87) PCT Pub. No.: WO2021/199170
PCT Pub. Date: Oct. 7, 2021

(65) Prior Publication Data
US 2023/0078191 A1    Mar. 16, 2023

(51) Int. Cl.
G06F 16/35 (2019.01)
B61L 15/00 (2006.01)
G06F 40/268 (2020.01)

(52) U.S. Cl.
CPC ........ G06F 40/268 (2020.01); B61L 15/0081 (2013.01); G06F 16/35 (2019.01)

(58) Field of Classification Search
None
See application file for complete search history.

(56) References Cited

U.S. PATENT DOCUMENTS 9,785,705 B1 * 10/2017 Cartright ................. G06F 16/35
10,810,508 B1 * 10/2020 Maximo ............... G06F 16/906
(Continued)

FOREIGN PATENT DOCUMENTS

| GB | 2491291 A | 11/2012 |
| WO | 2011118290 A1 | 9/2011 |
| WO | 2016/118672 A2 | 7/2016 |

OTHER PUBLICATIONS

Extended European Search Report dated Apr. 25, 2023, issued in the corresponding European Patent Application No. 20929652.4, 9 pages.
(Continued)

Primary Examiner — Eliyah S. Harper
(74) Attorney, Agent, or Firm — BUCHANAN, INGERSOLL & ROONEY PC (57) ABSTRACT

A data extraction apparatus includes a parameter analysis unit that performs analysis of learning text information, extracts words that serve as machine learning parameters, and classifies the words into types of parameters; a grouping settings display unit that finalizes search-target data and clustering conditions based on the parameters; at least one clustering training data extraction unit that extracts training data from a database based on the search-target data and the clustering conditions; at least one clustering unit that performs clustering based on the clustering condition on the training data; an applicable-clustering determination unit that performs analysis of search text information and identifies search-target data serving as a narrowing-down condition and which clustering unit is to be operated; and a search range specification unit that causes the clustering unit to operate and extracts a narrowed range of search-target data from the database based on an operation result.

11 Claims, 5 Drawing Sheets

(56) References Cited

U.S. PATENT DOCUMENTS

| | | | |
|---|---|---|---|
| 11,061,953 B2* | 7/2021 | Shah | G06F 40/258 |
| 11,157,816 B2* | 10/2021 | Truong | G06F 16/355 |
| 12,094,018 B1* | 9/2024 | O'Malley | G06Q 10/101 |
| 2011/0170777 A1 | 7/2011 | Inagaki | |
| 2018/0107647 A1* | 4/2018 | Ackermann | G06F 40/289 |
| 2018/0107648 A1* | 4/2018 | Ackermann | G06N 20/00 |
| 2018/0248895 A1* | 8/2018 | Watson | G06N 7/01 |
| 2019/0209022 A1* | 7/2019 | Sobol | H04W 4/80 |
| 2019/0266182 A1 | 8/2019 | Yoshikawa | |
| 2020/0035229 A1* | 1/2020 | Solanki | G10L 15/26 |
| 2020/0241972 A1* | 7/2020 | Dain | G06F 16/2457 |
| 2021/0019309 A1* | 1/2021 | Yadav | G06F 16/2428 |

OTHER PUBLICATIONS

International Search Report (PCT/ISA/210) with translation and Written Opinion (PCT/ISA/237) mailed on Jun. 2, 2020, by the Japan Patent Office as the International Searching Authority for International Application No. PCT/JP2020/014600. (8 pages).

Office Action issued in corresponding India Patent Application No. 202227052254, mailed on Jan. 27, 2023, 6 pages.

* cited by examiner

DATA EXTRACTION APPARATUS, DATA EXTRACTION METHOD, AND STORAGE MEDIUM

FIELD

The present disclosure relates to a data extraction apparatus that extracts desired data from a database and also relates to a data extraction method and a data extraction program.

BACKGROUND

Conventionally, data indicating operating states of devices are obtained from railroad vehicles in commercial operation to be analyzed, and utilizing a result of the analysis in condition-based maintenance (CBM) or the like has become a widespread trend. In such data analysis, efficiently performing work that includes setting an extraction condition, obtaining and narrowing down data, and accumulating knowledge is essential. A support system that assists in determining an anomaly in railroad vehicles uses a technique disclosed in Patent Literature 1 in data analysis based on accumulated data collected from the railroad vehicles for anomaly detection, preventive maintenance, or the like.

CITATION LIST

Patent Literature

Patent Literature 1: PCT International Publication No. 2011/118290

SUMMARY

Technical Problem

The above conventional technique enables the support system described in Patent Literature 1 to obtain data to be analyzed when a data extraction condition set for data analysis is definite. However, there is a problem that data that leads to new knowledge is missed depending on the extraction condition. When the extraction condition is indefinite, the support system described in Patent Literature 1 extracts an increased volume of data and thus cannot perform efficient data analysis, which is problematic.

The present disclosure has been made in view of the above, and an object of the present disclosure is to obtain a data extraction apparatus that is capable of efficiently extracting data necessary for data analysis while reducing or preventing omission of data that leads to new knowledge.

Solution to Problem

In order to solve the above-described problem and achieve the object, a data extraction apparatus according to the present disclosure includes: a parameter analysis unit to perform morphological analysis of learning text information received from a user, extract a word that serves as a machine learning parameter, and classify a plurality of the words into types of parameters, inclusive of learning-target data; a grouping settings display unit to finalize search-target data to be searched for in a database and a clustering condition on a basis of the parameters, the search-target data including the learning-target data; and at least one clustering training data extraction unit to extract training data that meet the clustering condition from the database on a basis of the search-target data and a plurality of the clustering conditions. Additionally, the data extraction apparatus includes: at least one clustering unit to perform, in a learning mode, clustering based on the clustering condition on the training data; an applicable-clustering determination unit to perform morphological analysis of search text information received from the user and identify search-target data serving as a narrowing-down condition and which clustering unit is to be operated; and a search range specification unit to cause a clustering unit identified by the applicable-clustering determination unit to operate and extract a narrowed range of search-target data from the database on a basis of an operation result from the clustering unit.

Advantageous Effect of Invention

The data extraction apparatus according to the present disclosure is capable of efficiently extracting data necessary for data analysis while reducing or preventing omission of data that leads to new knowledge.

DESCRIPTION OF EMBODIMENT

With reference to the drawings, a detailed description is hereinafter provided of a data extraction apparatus, a data extraction method, and a data extraction program according to an embodiment of the present disclosure.

Embodiment

Figure 1:
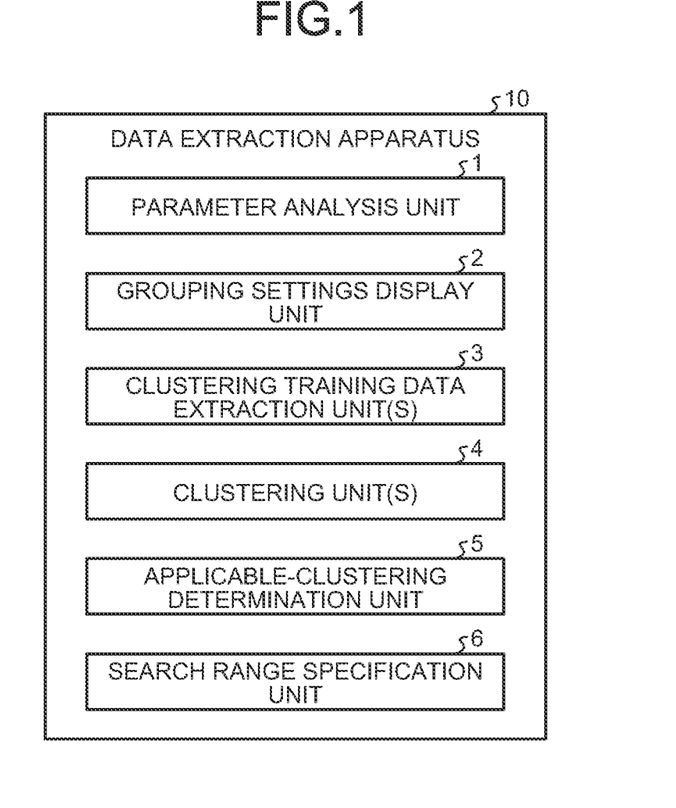
FIG. 1 illustrates a configuration example of a data extraction apparatus according to an embodiment.

FIG. 1 illustrates a configuration example of a data extraction apparatus 10 according to the embodiment. When a user uses data collected from railroad vehicles in commercial operation to perform analysis, the data extraction apparatus 10 extracts desired data, thus assisting the user in the analysis. The data extraction apparatus 10 includes a parameter analysis unit 1, a grouping settings display unit 2, a clustering training data extraction unit 3, a clustering unit 4, an applicable-clustering determination unit 5, and a search range specification unit 6.

The parameter analysis unit 1 performs morphological analysis of learning text information received as a fuzzy condition from the user. The parameter analysis unit 1 extracts words that serve as machine learning parameters and classifies the words into types of parameters, inclusive of learning-target data.

On the basis of the classified parameters of the parameter analysis unit 1, the grouping settings display unit 2 finalizes search-target data and clustering conditions. The search-target data includes the learning-target data and is to be searched for in a database.

On the basis of the search-target data and the clustering conditions, the clustering training data extraction unit 3 extracts training data that meet the clustering condition from the database. The data extraction apparatus 10 according to the present embodiment can include a plurality of the clustering training data extraction units 3. In other words, the data extraction apparatus 10 includes the at least one clustering training data extraction unit 3. In practice, the data extraction apparatus 10 needs to have only as many clustering training data extraction units 3 as learning units that the grouping settings display unit 2 has finalized after the classification by the parameter analysis unit 1. Therefore, the data extraction apparatus 10 is configured to enable operation of a required number of clustering training data extraction units 3.

The clustering unit 4 performs, in a learning mode, clustering based on the clustering condition on the training data extracted by the clustering training data extraction unit 3. As with the plurality of the clustering training data extraction units 3, a plurality of the clustering units 4 can be included in the data extraction apparatus 10 according to the present embodiment. In other words, the data extraction apparatus 10 includes the at least one clustering unit 4. In practice, the data extraction apparatus 10 needs to have only as many clustering units 4 as the learning units that the grouping settings display unit 2 has finalized after the classification by the parameter analysis unit 1. Therefore, the data extraction apparatus 10 is configured to enable operation of a required number of clustering units 4.

The applicable-clustering determination unit 5 performs morphological analysis of search text information received as a fuzzy condition from the user. The applicable-clustering determination unit 5 identifies search-target data serving as a narrowing-down condition and which clustering unit 4 is to be operated.

The search range specification unit 6 causes the clustering unit 4 identified by the applicable-clustering determination unit 5 to operate and extracts a narrowed range of search-target data from the database on the basis of an operation result from the clustering unit 4.

A description is provided here of search operation of a conventionally typical apparatus serving as a comparative example before how the data extraction apparatus 10 operates is described. For example, suppose that a user wants to retrieve data on "a time period within one day in which ridership is highest" in a numerical data search. In this case, the user may conventionally conceive of setting two specific search conditions: "A. ridership=70%" and "B. ridership=70% to 150%". However, the case A is associated with a concern about missing data. While an object of the data analysis is to generate new knowledge that leads to CBM, the data that lead to unknown knowledge are likely to be excluded from the analysis. The case B is associated with a concern about an excessive volume of data to be analyzed. If the data to be analyzed includes a lot of noise, the analysis is time-consuming, and there is also a concern about deteriorated analysis accuracy. In other words, when data that changes daily, such as the ridership, is used as a search key, support for dispersion of data cannot be provided with a conventional user-specified constant value. Moreover, a specific numerical indicator that defines "a time period in which ridership is highest" is indefinite in the search condition setting.

Figure 2:
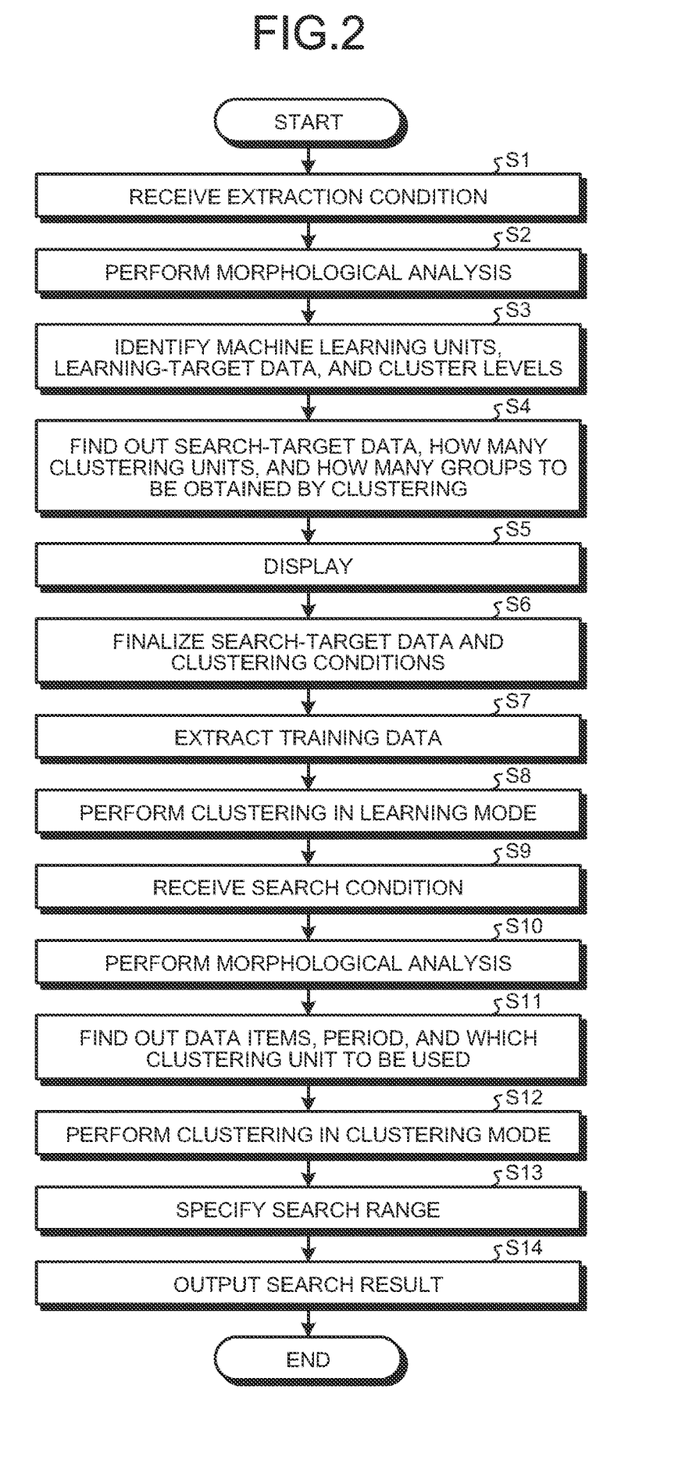
FIG. 2 is a flowchart illustrating how the data extraction apparatus according to the embodiment operates.
Figure 3:
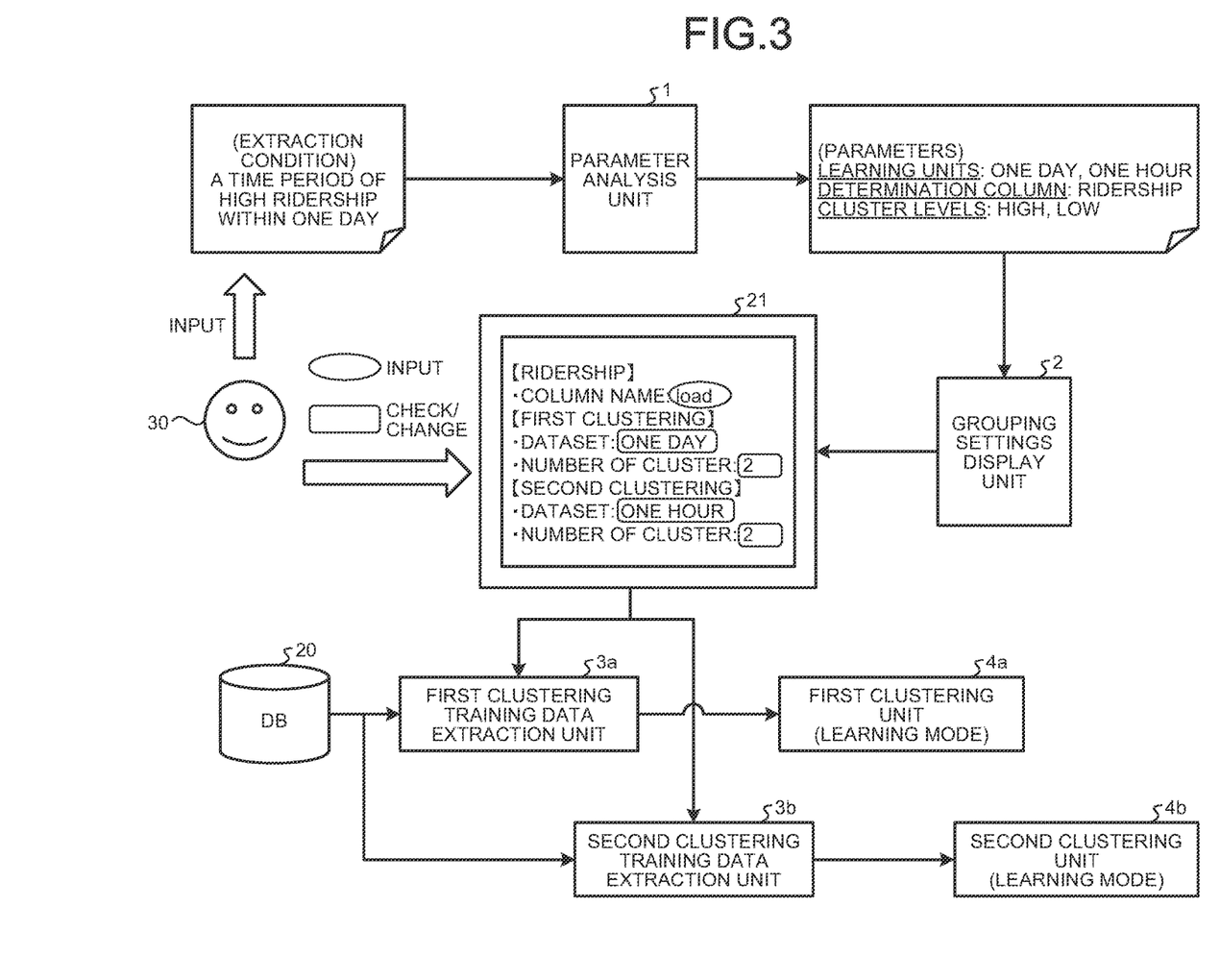
FIG. 3 is an image illustrating how the data extraction apparatus according to the embodiment operates in a learning phase.

In order to deal with a search based on an assigned fuzzy condition, the data extraction apparatus 10 according to the present embodiment predefines a fuzzy condition that would be assigned when data is narrowed down and performs machine learning-based clustering on the basis of the fuzzy condition that would be assigned. A specific description is provided of the operation of the data extraction apparatus 10. FIG. 2 is a flowchart illustrating how the data extraction apparatus 10 according to the present embodiment operates. The operation of the data extraction apparatus 10 according to the present embodiment is dividable into two phases: a learning phase and a search phase. How the data extraction apparatus 10 in the learning phase operates is described first. FIG. 3 is an image illustrating how the data extraction apparatus 10 according to the present embodiment operates in the learning phase. A database 20 that is searched by the data extraction apparatus 10 may be inside or outside the data extraction apparatus 10.

A user 30 puts the data extraction apparatus 10 in the learning mode. The user 30 enters an extraction condition that would be used in a search, that is to say, a narrowing-down condition into the parameter analysis unit 1 of the data extraction apparatus 10. In the example of FIG. 3, the user 30 enters the extraction condition "A TIME PERIOD OF HIGH RIDERSHIP WITHIN ONE DAY" into the parameter analysis unit 1.

Upon receiving the extraction condition from the user 30 (step S1), the parameter analysis unit 1 performs morphological analysis (step S2). On the basis of the fuzzy condition received as learning text information from the user 30, the parameter analysis unit 1 identifies machine learning units, learning-target data, and cluster levels (step S3). In the example of FIG. 3, the machine learning units, that is to say, machine learning ranges refer to "ONE DAY" and "ONE HOUR", the learning-target data belongs to a determination column "RIDERSHIP", and the cluster levels refer to "HIGH" and "LOW". In FIG. 3, "ONE DAY", "ONE HOUR", "RIDERSHIP", "HIGH", and "LOW" are parameters. The parameter analysis unit 1 identifies these machine learning units, these learning-target data, and these cluster levels as categories referring to the above-mentioned types of parameters.

The parameter analysis unit 1 may include preset information from the user 30 that includes a set including a possible word or words in an extraction condition from the user 30 and a word or words that are paired with the possible word(s), such as an antonym or a synonym. For example, assuming that the extraction condition would include "high", the user 30 presets a word set including "high" and "low" in the parameter analysis unit 1. Assuming that an extraction condition would include "many", the user 30 presets a word set including "many" and "few" in the parameter analysis unit 1. Assuming that an extraction condition would include "one day", the user 30 presets a set including the words "one day" and words such as "one hour" or "one minute" in the parameter analysis unit 1. In accordance with an application of the data extraction apparatus 10, the user 30 may preset, in the parameter analysis unit 1, information that includes a set including a possible word or words and a word or words that are paired with the possible word(s). In the present embodiment, the data extraction apparatus 10 is assumed to be for use in the railroad industry. Therefore, the user 30 may preset information including a word set specific to a railroad in the parameter analysis unit 1. Using the preset information, which includes the set that includes the possible word(s) that would be used in the learning text information and the word(s) paired with the possible word(s), the parameter analysis unit 1 may identify machine learning units and cluster levels. In this way, the parameter analysis unit 1 is enabled to easily classify parameters by type on the basis of a morphological analysis result.

The grouping settings display unit 2 finds out the search-target data, that is to say, the database 20 that is linked to "RIDERSHIP", which refers to the learning-target data that the parameter analysis unit 1 has classified, a corresponding table in the database 20, and data items in the table. Moreover, the grouping settings display unit 2 finds out how many clustering units 4 are to be prepared from a classified number of learning units of the parameter analysis unit 1 and finds out, from a classified number of cluster levels of the parameter analysis unit 1, how many groups are to be obtained by clustering-based grouping (step S4). Search ranges that are equal in number to the clustering units 4 and the number of cluster levels to be obtained by the clustering-based grouping, namely, the number of groups refer to the above-mentioned clustering conditions. The grouping settings display unit 2 provides, for the user 30, a display of the search-target data and the clustering conditions, that is to say, a display of the determined search-target data, the determined number of clustering units 4, and the determined number of groups to be obtained by the clustering-based grouping (step S5).

Specifically, the grouping settings display unit 2 displays a display screen 21 illustrated in the center of FIG. 3. The display screen 21 shows that the learning-target data is about "RIDERSHIP" and that a column name for the search-target data in the database 20 is "load". The display screen 21 also shows that the number of clustering units 4 to be prepared is two, since the learning units are two in number, referring to "ONE DAY" and "ONE HOUR". "FIRST CLUSTERING" and "SECOND CLUSTERING" in the example of FIG. 3 represent the two clustering units 4 to be prepared. The display screen 21 shows that "FIRST CLUSTERING" is for a dataset that refers to the above-mentioned learning unit "ONE DAY" and provides two clusters "HIGH" and "LOW". The display screen 21 similarly shows that "SECOND CLUSTERING" is for a dataset that refers to the above-mentioned learning unit "ONE HOUR" and provides two clusters "HIGH" and "LOW".

The user 30 checks whether or not each piece of machine learning parameter information displayed by the grouping settings display unit 2 agrees with what the user 30 has intended by the fuzzy condition entered into the parameter analysis unit 1. If necessary, the user 30 performs revision on the screen of the grouping settings display unit 2. The grouping settings display unit 2 accepts the revision, which has been performed by the user 30 on an as-needed basis. Without displaying the column name for the search-target data first, the grouping settings display unit 2 may receive the column name from the user 30. The grouping settings display unit 2 may display an operation button such as an "OK" button to receive an "OK" operation from the user 30 when the user 30 performs no revision or after the user 30 performs the revision. As described above, the grouping settings display unit 2 displays the search-target data and the clustering conditions and finalizes the search-target data and the clustering conditions after receiving any changes to the search-target data and the clustering conditions or the "OK" operation from the user 30 (step S6).

The grouping settings display unit 2 prepares the required number of clustering units 4 and a required number of clustering training data extraction units 3 and causes each of these units 4 and 3 to operate for learning of clustering using input time series data. In the example of FIG. 3, the grouping settings display unit 2 prepares, for the first clustering, a first clustering training data extraction unit 3a and a first clustering unit 4a and, for the second clustering, a second clustering training data extraction unit 3b and a second clustering unit 4b. The first and second clustering training data extraction units 3a and 3b refer to the above-mentioned clustering training data extraction units 3. The first and second clustering units 4a and 4b refer to the above-mentioned clustering units 4.

The first clustering training data extraction unit 3a extracts, from the "load" data in the database 20 that is the search-target data finalized by the grouping settings display unit 2, training data that is as much as "ONE DAY" as the dataset. The second clustering training data extraction unit 3b similarly extracts, from the "load" data in the database 20 that is the search-target data finalized by the grouping settings display unit 2, training data that is as much as "ONE HOUR" as the dataset (step S7).

Using the extracted training data from the first clustering training data extraction unit 3a that is as much as "ONE DAY", the first clustering unit 4a performs the clustering in the learning mode. Using the extracted training data from the second clustering training data extraction unit 3b that is as much as "ONE HOUR", the second clustering unit 4b similarly performs the clustering in the learning mode (step S8). A machine learning method that the data extraction apparatus 10 uses when operating in the learning phase is not particularly limited. The data extraction apparatus 10 may be composed of a plurality of devices if learning units increase in number and thus increase the number of clustering training data extraction units 3 and the number of clustering units 4.

Figure 4:
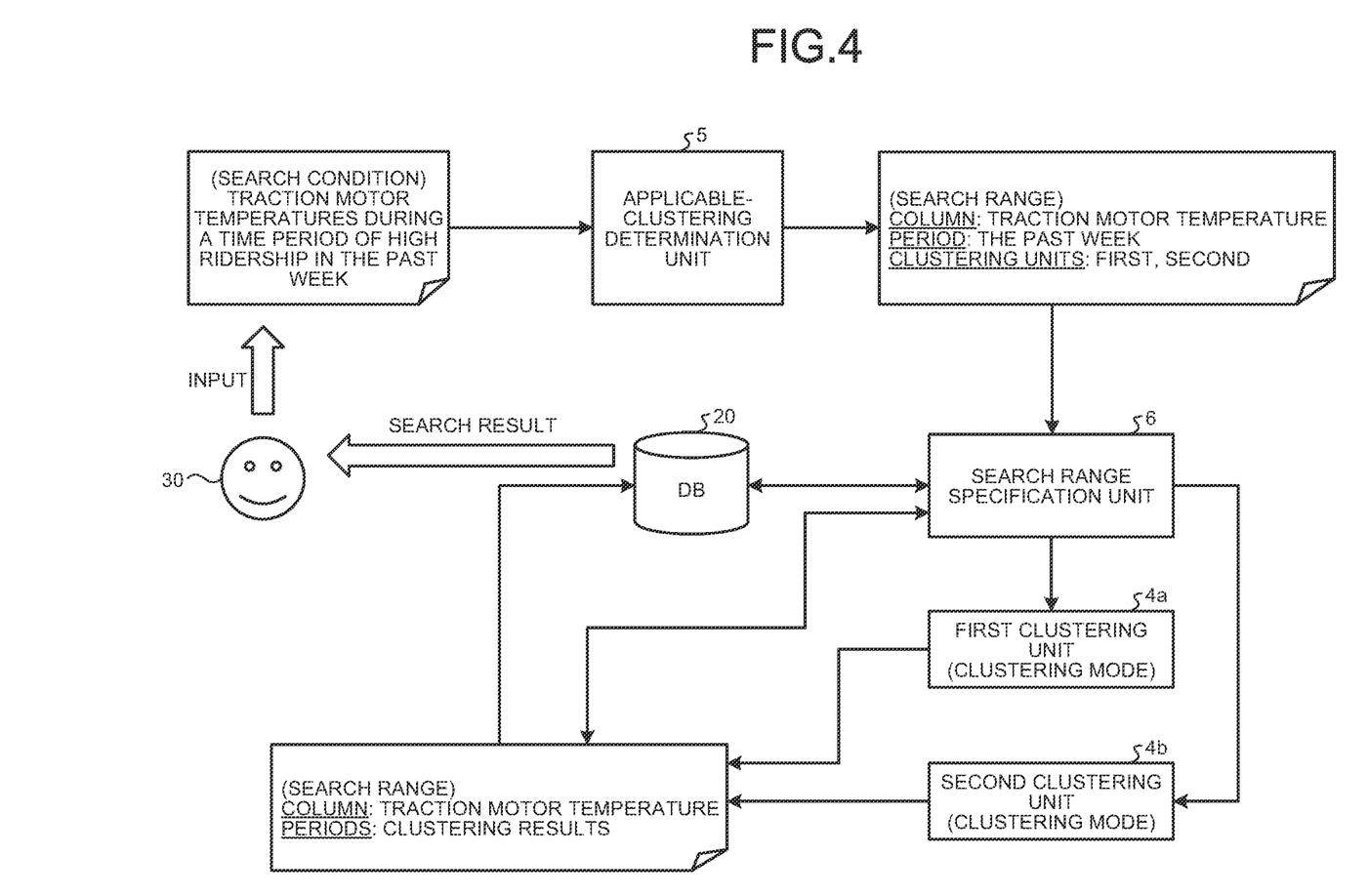
FIG. 4 illustrates an operational flow of the data extraction apparatus according to the embodiment in a search phase.

How the data extraction apparatus 10 in the search phase operates is described next. FIG. 4 illustrates an operational flow of the data extraction apparatus 10 according to the present embodiment in the search phase.

The user 30 puts the data extraction apparatus 10 in a search mode. The user 30 enters a search condition, that is to say, a narrowing-down condition into the applicable-clustering determination unit 5 of the data extraction apparatus 10. In the example of FIG. 4, the user 30 enters the search condition "TRACTION MOTOR TEMPERATURES DURING A TIME PERIOD OF HIGH RIDERSHIP IN THE PAST WEEK" into the applicable-clustering determination unit 5. The user 30 in FIG. 4 and the user 30 in FIG. 3 may be the same person or different persons.

Upon receiving the search condition from the user 30 (step S9), the applicable-clustering determination unit 5 performs morphological analysis (step S10). From the fuzzy condition received as search text information from the user 30, the applicable-clustering determination unit 5 finds out a search target, that is to say, the database 20 that agrees with the narrowing-down condition, a corresponding table in the database 20, and data items in the table. The applicable-clustering determination unit 5 also finds out a period that will be subject to a data search. The applicable-clustering determination unit 5 also finds out which clustering unit 4 is to be used (step S11). The applicable-clustering determination unit 5 recognizes by comparison that the search condition "TRACTION MOTOR TEMPERATURES DURING A TIME PERIOD OF HIGH RIDERSHIP IN THE PAST WEEK" received from the user 30 and the above-mentioned extraction condition "A TIME PERIOD OF HIGH RIDERSHIP WITHIN ONE DAY" agree in "A TIME PERIOD OF HIGH RIDERSHIP". On the basis of the words common to the search text information and the learning text information, the applicable-clustering determination unit 5 can identify or find out which clustering unit 4 is to be operated.

The applicable-clustering determination unit 5 finds that a search range includes the search-target data in a column "TRACTION MOTOR TEMPERATURE", the period "THE PAST WEEK", and the first and second clustering units 4a and 4b as the clustering units 4.

The search range specification unit 6 causes each of the first and second clustering units 4a and 4b selected by the applicable-clustering determination unit 5 to perform, on a sequential basis in a clustering mode, clustering on the corresponding data items in the database 20 (step S12) and specifies a time-based search range (step S13). The search range that the search range specification unit 6 specifies includes the column "TRACTION MOTOR TEMPERATURE" and periods "CLUSTERING RESULTS". Using the specified search range as a search key, the search range specification unit 6 narrows down the search-target data and outputs extracted data as a search result to the user 30 (step S14). The search result that the search range specification unit 6 outputs may be in data form or may be displayed on a display screen that is not illustrated.

A description is provided next of a hardware configuration of the data extraction apparatus 10. The parameter analysis unit 1, the grouping settings display unit 2, the clustering training data extraction unit 3, the clustering unit 4, the applicable-clustering determination unit 5, and the search range specification unit 6 that are included in the data extraction apparatus 10 are implemented with processing circuitry. The processing circuitry may include a memory and a processor that executes programs stored in the memory or may be dedicated hardware.

Figure 5:
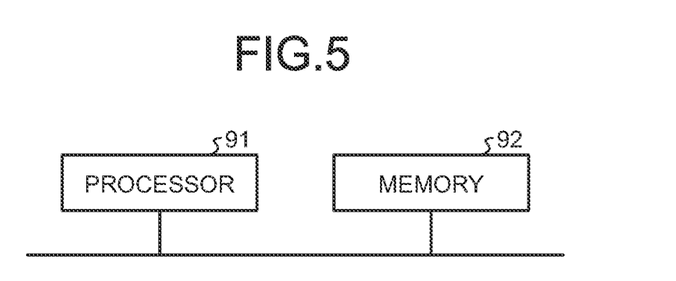
FIG. 5 illustrates an example in which processing circuitry of the data extraction apparatus according to the embodiment is configured to include a processor and a memory.

FIG. 5 illustrates an example in which the processing circuitry of the data extraction apparatus 10 according to the present embodiment is configured to include a processor 91 and a memory 92. When the processing circuitry includes the processor 91 and the memory 92, the processing circuitry of the data extraction apparatus 10 is functionally implemented by software, firmware, or a combination of software and firmware. The software or the firmware is described as programs and is stored in the memory 92. In the processing circuitry, the processor 91 reads and executes the programs stored in the memory 92 for functional implementations. This means that the memory 92 included in the processing circuitry stores the programs, which eventually execute the processes of the data extraction apparatus 10. These programs can be said to cause a computer to execute the steps and the method of the data extraction apparatus 10.

The processor 91 herein may be, for example, a central processing unit (CPU), a processing unit, an arithmetic unit, a microprocessor, a microcomputer, or a digital signal processor (DSP). The memory 92 corresponds to, for example, a nonvolatile or volatile semiconductor memory such as a random-access memory (RAM), a read-only memory (ROM), a flash memory, an erasable programmable ROM (EPROM), or an electrically EPROM (EEPROM) (registered trademark), a magnetic disk, a flexible disk, an optical disk, a compact disk, a mini disk, or a digital versatile disc (DVD).

Figure 6:
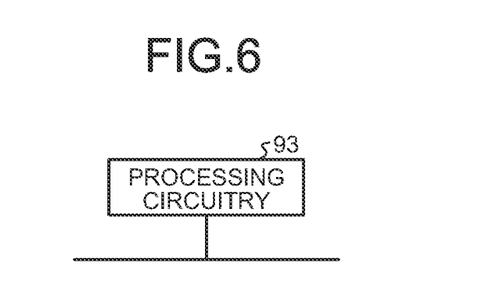
FIG. 6 illustrates an example in which the processing circuitry of the data extraction apparatus according to the embodiment is configured as dedicated hardware.

FIG. 6 illustrates an example in which the processing circuitry of the data extraction apparatus 10 according to the present embodiment is configured as dedicated hardware. When the processing circuitry is the dedicated hardware, the processing circuitry 93 illustrated in FIG. 6 corresponds to, for example, a single circuit, a composite circuit, a programmed processor, a parallel programmed processor, an application specific integrated circuit (ASIC), a field-programmable gate array (FPGA), or a combination of these. Those functions of the data extraction apparatus 10 may be implemented individually or collectively with the processing circuitry 93.

Some of the functions of the data extraction apparatus 10 may be implemented by dedicated hardware, while some of the other functions may be implemented by software or firmware. By including the dedicated hardware, the software, the firmware or a combination of these, the processing circuitry is capable of the above functional implementations.

As described above, in order to deal with a search based on an assigned fuzzy condition, the data extraction apparatus 10 according to the present embodiment predefines a fuzzy condition that would be assigned when data is narrowed down and performs machine learning-based clustering on the basis of the fuzzy condition that would be assigned. Accordingly, the data extraction apparatus 10 is capable of efficiently extracting data necessary for data analysis while reducing or preventing omission of data that leads to new knowledge. The data extraction apparatus 10 provides support for dispersion of daily data in time series data and other changes in response to an entered fuzzy search condition that specifies qualitative values in text form rather than quantitative values, enabling efficient narrowing down of data in a range necessary for data analysis.

While the data extraction apparatus 10 described in the present embodiment is used in the analysis of data collected from the railroad vehicles, the data extraction apparatus 10 is not limited to this application.

The above configuration illustrated in the embodiment is illustrative, can be combined with other techniques that are publicly known, and can be partly omitted or changed without departing from the gist. The embodiment can be combined with another embodiment.

REFERENCE SIGNS LIST

1 parameter analysis unit; 2 grouping settings display unit; 3 clustering training data extraction unit; 3a first clustering training data extraction unit; 3b second clustering training data extraction unit; 4 clustering unit; 4a first clustering unit; 4b second clustering unit; 5 applicable-clustering determination unit; 6 search range specification unit; 10 data extraction apparatus; 20 database; 30 user.

The invention claimed is:
1. A data extraction apparatus comprising:
a parameter analysis circuitry to perform analysis of learning text information, extract a word that serves as a machine learning parameter, and classify a plurality of the words into types of parameters, inclusive of learning-target data;
a grouping settings display circuitry to finalize search-target data to be searched for in a database and a clustering condition on a basis of the parameters, the search-target data including the learning-target data;
at least one clustering training data extraction circuitry to extract training data that meet the clustering condition from the database on a basis of the search-target data and a plurality of the clustering conditions;
at least one clustering circuitry to perform, in a learning mode, clustering based on the clustering condition on the training data;

an applicable-clustering determination circuitry to perform analysis of search text information and identify search-target data serving as a narrowing-down condition and which clustering circuitry is to be operated; and a search range specification circuitry to cause the clustering circuitry identified by the applicable-clustering determination circuitry to operate and extract a narrowed range of search-target data from the database on a basis of an operation result from the clustering circuitry.

2. The data extraction apparatus according to claim 1, wherein the parameter analysis circuitry identifies a machine learning unit, the learning-target data, and a cluster level as categories referring to the types of parameters.

3. The data extraction apparatus according to claim 2, wherein the parameter analysis circuitry includes preset information including a set that includes a possible word that would be used in the learning text information and a word that is paired with the possible word and identifies a plurality of the machine learning units and a plurality of the cluster levels, using the preset information.

4. The data extraction apparatus according to claim 1, wherein the grouping settings display circuitry displays the search-target data and the plurality of the clustering conditions and accepts any changes to the search-target data and the plurality of the clustering conditions from the user.

5. The data extraction apparatus according to claim 1, wherein the applicable-clustering determination circuitry identifies which clustering circuitry is to be operated on a basis of a word common to the search text information and the learning text information.

6. A data extraction method comprising:

by a parameter analysis circuitry, performing analysis of learning text information, extracting a word that serves as a machine learning parameter, and classifying a plurality of the words into types of parameters, inclusive of learning-target data;

by a grouping settings display circuitry, finalizing search-target data to be searched for in a database and a clustering condition on a basis of the parameters, the search-target data including the learning-target data;

by at least one clustering training data extraction circuitry, extracting training data that meet the clustering condition from the database on a basis of the search-target data and a plurality of the clustering conditions;

by at least one clustering circuitry, performing, in a learning mode, clustering based on the clustering condition on the training data;

by an applicable-clustering determination circuitry, performing analysis of search text information and identifying search-target data serving as a narrowing-down condition and which clustering circuitry is to be operated; and by a search range specification circuitry, causing the clustering circuitry identified by the applicable-clustering determination circuitry to operate and extracting a narrowed range of search-target data from the database on a basis of an operation result from the clustering circuitry.

7. The data extraction method according to claim 6, wherein in classifying, by the parameter analysis circuitry, the plurality of the words into types of parameters, the learning-target data, and a cluster level are identified as categories referring to the types of parameters.

8. The data extraction method according to claim 7, wherein in classifying, by the parameter analysis circuitry, the plurality of the words into types of parameters, information including a set that includes a possible word that would be used in the learning text information and a word that is paired with the possible word is preset, and a plurality of the machine learning units and a plurality of the cluster levels are identified, using the preset information.

9. The data extraction method according to claim 6, wherein finalizing, by the grouping settings display circuitry, the search-target data and the clustering condition includes displaying the search-target data and the plurality of the clustering conditions and accepting any changes to the search-target data and the plurality of the clustering conditions from user.

10. The data extraction method according to claim 6, wherein in identifying, by the applicable-clustering determination circuitry, the clustering circuitry, which clustering circuitry is to be operated is identified on a basis of a word common to the search text information and the learning text information.

11. A non-transitory computer-readable storage medium having a program stored therein, the program causing a data extraction apparatus to carry out the data extraction method according to claim 6.

* * * * *